(12) United States Patent
Poechmueller et al.

(10) Patent No.: US 8,812,650 B2
(45) Date of Patent: Aug. 19, 2014

(54) METHOD AND DEVICE FOR DESCRIBING DATA TRANSMISSIONS THROUGH SUPPLEMENTARY DATA

(75) Inventors: Werner Poechmueller, Hildesheim (DE); Friedhelm Pickhard, Sibbesse (DE)

(73) Assignee: Robert Bosch GmbH, Stuttgart (DE)

( * ) Notice: Subject to any disclaimer, the term of this patent is extended or adjusted under 35 U.S.C. 154(b) by 2209 days.

(21) Appl. No.: 11/430,466

(22) Filed: May 8, 2006

(65) Prior Publication Data

US 2006/0259808 A1      Nov. 16, 2006

(30) Foreign Application Priority Data

May 6, 2005   (DE) .......................... 10 2005 021 129

(51) Int. Cl.
*G06F 15/173* (2006.01)
*H04W 24/00* (2009.01)
*H04W 4/02* (2009.01)
*H04L 29/08* (2006.01)

(52) U.S. Cl.
CPC ..... *H04W 4/02* (2013.01); *H04L 67/18* (2013.01)
USPC .......................... 709/224; 701/469; 455/456.1

(58) Field of Classification Search
CPC ................................ H04W 4/02; H04L 67/18
USPC ......... 709/201, 202, 224; 455/456.1; 701/469
See application file for complete search history.

(56) References Cited

U.S. PATENT DOCUMENTS

| 6,233,448 B1 * | 5/2001 | Alperovich et al. ........... 455/417 |
| 2003/0045301 A1 * | 3/2003 | Wollrab ........................ 455/456 |
| 2003/0134645 A1 * | 7/2003 | Stern et al. ..................... 455/456 |
| 2003/0135463 A1 | 7/2003 | Brown et al. |
| 2003/0169881 A1 | 9/2003 | Niedermeyer |
| 2004/0203909 A1 * | 10/2004 | Koster ........................ 455/456.1 |
| 2005/0143096 A1 * | 6/2005 | Boesch ....................... 455/456.3 |

FOREIGN PATENT DOCUMENTS

| EP | 1 255 380 | 11/2002 |
| WO | 98 57125 | 12/1998 |
| WO | WO 02/25821 | 3/2002 |
| WO | WO 03/036576 | 5/2003 |

* cited by examiner

*Primary Examiner* — Hieu Hoang
(74) *Attorney, Agent, or Firm* — Kenyon & Kenyon LLP

(57) ABSTRACT

A method for transmitting useful data from a data source to a data sink, the data source being connected to a locating unit, the useful data in the data source being assigned supplementary data derived from information of the locating unit connected to the data source, which are transmitted to the data sink together with the useful data, wherein the received useful data in the data sink are assigned additional supplementary data, which are derived from additional information of a locating unit connected to the data sink. A system for transmitting useful data from a data source to a data sink, the data source being connected to a locating unit and the data source being designed to assign to the useful data supplementary data derived from information of the locating unit connected to the data source and to transmit it to the data sink together with the useful data, wherein the data sink is connected to a locating unit and the data sink is designed to assign to the received useful data additional supplementary data, which are derived from additional information of the locating unit connected to the data sink. When the supplementary data assigned on the source-side and the additional supplementary data assigned on the sink-side are set in relation to each other, information about the data transmission may be obtained therefrom.

18 Claims, 1 Drawing Sheet

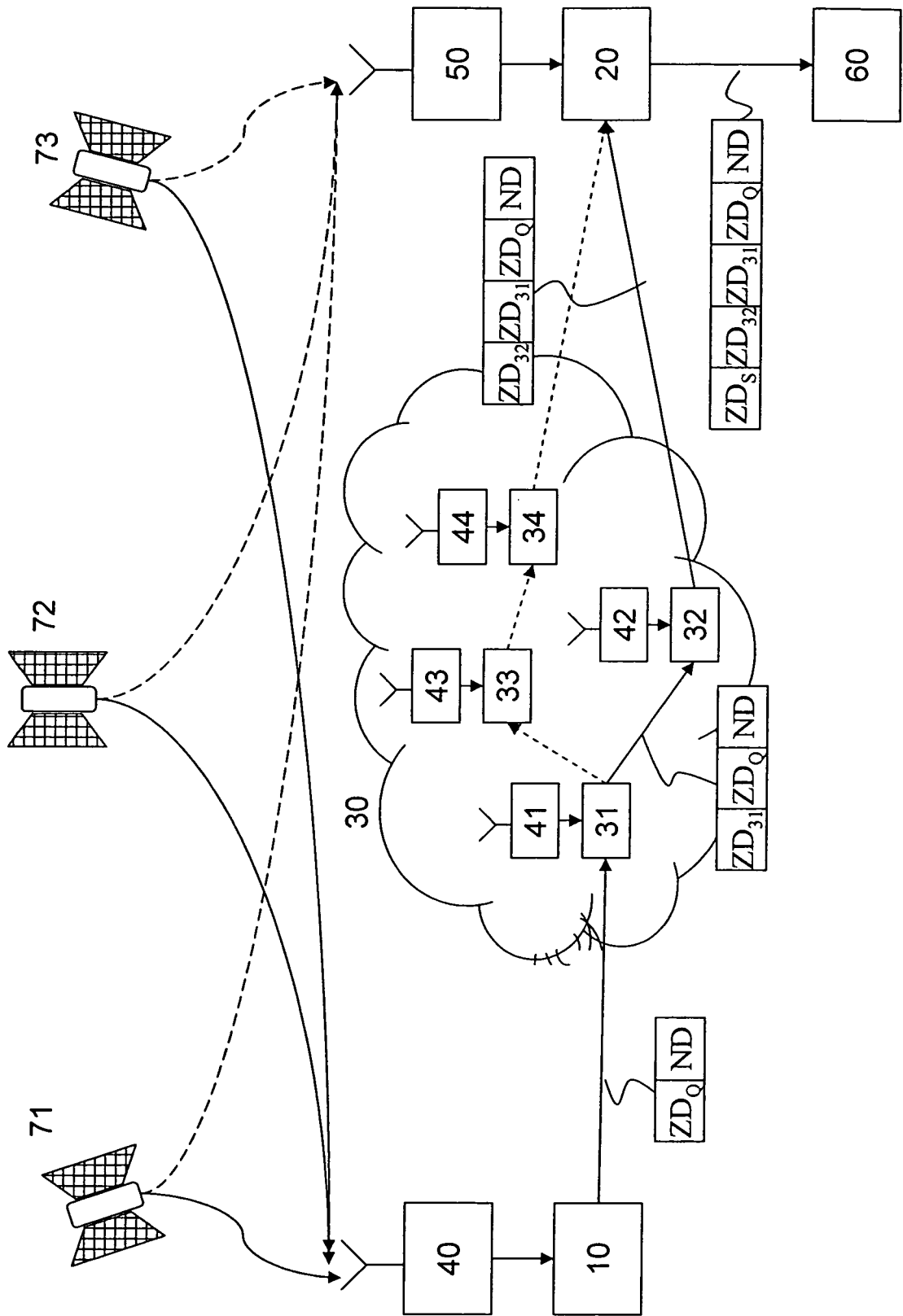

METHOD AND DEVICE FOR DESCRIBING DATA TRANSMISSIONS THROUGH SUPPLEMENTARY DATA

FIELD OF THE INVENTION

The present invention is based on a method and a system.

BACKGROUND INFORMATION

The exchange of data plays an increasingly important role in business. Pertinent examples are bank transactions, stock exchange transactions and similar operations. The verification requirement has become more and more important. Questions such as "Where and when was a transaction ordered?"; "Where and when was the order received and executed?" have to be answered. To clear up such questions in connection with the verification requirement, the data to be transmitted during the transaction must be provided with supplementary information. This is currently done by signatures, manual entries of locations and persons or, for instance, by providing clocks in computers or supplementary information permanently entered in stationary computers. This becomes problematic in particular when the processing units transmitting transaction data are not stationary and are locally mobile or if they have reduced input possibilities for supplementary information.

Vehicle navigation systems are known which determine an individual instantaneous vehicle location on the basis of received signals from GPS (global positioning system) navigation satellites. The signals of the GPS satellites also include information about an instantaneous chronological time.

From PCT International Published Application No. 98 57125, for example, a vehicle navigation system is known which determines a vehicle's individual instantaneous position during driving and stores it together with time information. Time-dependent section information is generated and recorded in this manner.

Furthermore, a so-called FCD (floating car data) system has become known in which locations of vehicles of a vehicle fleet are determined together with additional parameters such as vehicle speed, for instance, and transmitted via a radio link to a central station where the received vehicle data are analyzed in order to derive information about obstructions of traffic on particular sections of the road network, for example.

SUMMARY OF THE INVENTION

The present invention advantageously allows the verification of data transmissions from a data source to a data sink on the basis of supplementary information, which is derived from information of a locating unit on the transmitter and the receiver side.

To this end, a method and a system for the transmission of useful data from a data source to a data sink are provided, the data source being connected to a locating unit, and the useful data in the data source are assigned supplementary data, which is derived from information of the locating unit connected to the data source and transmitted to the data sink together with the useful data, where the received useful data in the data sink are assigned additional supplementary data, which are derived from additional information of a locating unit connected to the data sink.

If the supplementary data assigned on the side of the source and the additional supplementary data assigned on the side of the sink are set in relation to each other, information about the data transmission may be obtained therefrom.

Locating systems, in particular the European GALILEO satellite positioning system under development, provide time and location information of such high quality that transaction data are able to be automatically provided with supplementary data from a locating module on its way from transmitter to receiver, so that a reliable reconstruction of the path taken by the transaction data is possible later on. Also possible is a reliable reconstruction of the time at which a transaction datum had been at a particular location. Moreover, the reconstruction in a mobile network is possible since the locating module is always able to determine the absolute chronological time and also the absolute location of a unit that is sending, receiving or forwarding the transaction data, and thus is able to determine the transmission time, transmission location, receiving time, receiving location, forwarding time, forwarding location. This applies in particular to a mobile transaction network in which transaction data are sent between mobile processing units equipped with locating modules.

It is advantageous if an additional device is provided in which the supplementary data assigned on the side of the source and the additional supplementary data assigned on the side of the sink are automatically set in relation to each other.

In addition, however, it is also possible to manually adjust the supplementary or the additional supplementary data assigned on the side of the source and on the side of the sink, or to set it in relation to each other.

It is advantageous if the supplementary information includes a time datum of the two locating modules of the data source and the data sink. Furthermore, it is advantageous if, as an alternative or in addition, the supplementary information includes an item of location information of the two locating modules of the data source and the data sink.

It is advantageous if the relation consists of a time comparison of the two items of supplementary information, and the run time of the useful information from the data source to the data sink is determined on this basis. Furthermore, it is advantageous if, as an alternative or in addition, the relation consists of a location comparison of the two items of supplementary information, and the distance or the run path between data source and data sink is determined in this manner.

It is advantageous if the useful information is linked with an additional item of supplementary information in each forwarding processing unit on its way from the data source to the data sink via at least one forwarding processing unit, the additional item of supplementary information being generated in the locating module assigned to the individual forwarding processing unit, and the local path of the useful information being reconstructed by the relation. It is also advantageous if the useful information is linked with an item of supplementary information in each forwarding processing unit on a path from the data source to the data sink via at least one forwarding processing unit, the item of supplementary information being ascertained by the locating device assigned to the processing unit, and the chronological processing sequence of the useful information is reconstructed by the relation.

It is advantageous if the useful information or a portion of the useful information is entered in the data source with the aid of a changeable memory, such as a chip card, which is able to be analyzed by the data source. In this context it is also advantageous if the changeable memory is provided for storing the supplementary data transmitted together with the useful data by the data source.

An advantageous specific embodiment is directed toward an embodiment of the changeable memory in the form or as a component of a computer, for instance a personal computer, a mobile telephone or a PDA or handheld computer.

The data source and/or the data sink may advantageously be a mobile telephone, a personal computer, a laptop computer, a PDA computer, a driver-information system of a motor vehicle, an automated teller machine or the like.

The locating unit, or at least one of the locating units in the case of a plurality of locating units, may advantageously be embodied by a satellite receiver, in particular a GPS or GALILEO receiver, a mobile radio receiver, in particular a GSM, GPRS or UMTS mobile radio receiver, and/or include an inertial sensor system and/or a digital map and/or a map-matching routine.

To protect against unauthorized manipulation of the useful or the supplementary data, the data may advantageously be linked to each other with the aid of encryption technology, which is known under the keyword "digital watermarking", for instance.

BRIEF DESCRIPTION OF THE DRAWING

The Figure shows a system according to the present invention for implementing the method according to the present invention.

DETAILED DESCRIPTION

The Figure shows a system according to the present invention for implementing the method of the present invention.

The system according to the present invention includes a data source 10 and a data sink 20, which are connected to one another via a communication network 30. Data source 10 transmits data, in particular useful data ND, to data sink 20 via communication network 30.

Data source 10 is connected to a locating unit 40, which determines its own position and/or an instantaneous chronological time and provides this information to data source 10. In the case at hand, locating unit 40 is embodied as a receiver for satellite signals from a satellite positioning system. Such a satellite positioning system, for instance the established GPS (global positioning system) system, or, alternatively, the Galileo system presently being developed in Europe, includes a multitude of satellites 71, 72, 73, which transmit signals suitable for position determination and additionally also include time information such as a normal time, in particular. From the signals received from these satellites 71, 72, 73, the locating unit ascertains its individual instantaneous location and the instantaneous chronological time.

Alternative specific embodiments of locating device 40 are possible and lie within the parameters of the present invention. For instance, the locating unit may also be designed to determine position and time information from signals of a mobile radio network according to the GSM, GPRS, UMTS or a comparable standard. These networks include a multitude of radio transmission and receiving stations, a corresponding radio device regularly exchanging signals with one of this multitude of radio stations. As a result, an at least rough localization is possible by assigning the radio device to a radio station.

The locating unit may also include, for instance, an inertial sensor system as it is known from vehicle navigation devices, for example. A gyroscopic compass, also gyroscope, may be provided, for instance, which detects changes in direction; furthermore, acceleration sensors may be included, at least for detecting directional changes in translatory motions. On the basis of a known position and by analyzing the signals of the inertial sensor system, this inertial sensor system is able to determine subsequent positions.

Furthermore, locating unit 40 may include a digital map and also a map-matching routine known from vehicle navigation, which adjusts the position and/or direction data to those on the digital map within the meaning of a plausibility check and ascertains a resulting position therefrom or corrects position data according to the adjustment.

As soon as data source 10 begins with the transmission of useful data ND to data sink 20, useful data ND are linked with supplementary information $ZD_Q$ of connected locating unit 40, for instance the instantaneous chronological time or, as an alternative or in addition thereto, the instantaneous position of locating unit 40. This linking of useful and supplementary data ND and $ZD_Q$, respectively, is transmitted to data sink 20 via communication network 30.

Data sink 20 is connected to another locating unit 50, which determines its own position and/or an instantaneous chronological time analogously to locating unit 40, and provides this information to data sink 20.

Data sink 20 receives useful and supplementary data ND and $ZD_Q$, respectively, transmitted by data source 10 via communication network 30. As soon as the data transmitted by data source 10, i.e., useful and supplementary data, arrive at data sink 20, it assigns to this data additional supplementary data $ZD_s$, which are derived from additional supplementary information of additional locating unit 50. Supplementary data $ZD_s$ assigned by the data sink are supplementary data which correspond to the supplementary data assigned on the transmitter side.

Moreover, the system includes a checking device 60 to which useful data ND, supplementary data $ZD_Q$ and additional supplementary data $ZD_s$ are supplied by data sink 20. Checking device 60 is designed to set supplementary data $ZD_Q$ of data source 10 and additional supplementary data $ZD_s$ of data sink 20 in relation to each other, thereby allowing inferences regarding the transmission operation.

Setting in relation to each other thus means, in particular but not exclusively, a determination of the run time of the useful data from data source 10 to data sink 20, possibly via forwarding processing units 31, 32, 33, 34, from useful data $ZD_Q$ and $ZD_s$ and possibly additionally from $ZD_{31}$ and $ZD_{32}$, and/or a comparison of the locations of data source 10 and data sink 20 involved in the transaction, as well as the possibly inserted processing units 31, ... 34, which forward the useful data.

The afore-described data transmission system and method may be used to advantage in cashless payment transactions, for instance, or in other data transactions via the Internet, the telephone or other transmission channels.

A transmitting processing unit 10 wants to transmit its useful data to a receiving processing unit 20. As soon as the transaction is started, transmitting processing unit 10 links its useful information to the supplementary information of its local locating module 40. This information could be a chronological time, for example. Since satellite positioning modules are able to ascertain the absolute chronological time in the millisecond range, it is possible, for instance, to establish the precise chronological time of the beginning of the transaction and to link it to the useful data. Another meaningful development would be the linking with an item of location information since satellite positioning modules are able to determine the absolute location position within the meter range.

As soon as the transaction data started by transmitting processing unit 10 arrive in receiving processing unit 20, this receiving processing unit 20, using its own local locating module 50, may in turn generate the same type of supplementary information as locating module 40 of transmitting unit 10. In the mentioned example this is a chronological time or a local time of receipt.

The transaction system includes a device 60 to set the supplementary information of transmitting processing unit 10 in relation to the supplementary information of receiving processing unit 20. In this way the run time of the transaction, for example, can be determined with an accuracy in the range of a millisecond. The method may be implemented either on receiving processing unit 20 or in a separate checking device 60 outside of receiving processing unit 20. In the latter case, the supplementary information of additional locating module 50 of receiving processing unit 20 must be linked to or stored together with the useful data.

The described system of processing units may be made up of physically separate processing units in a computer network, which are interconnected by known networking technologies such as the Ethernet, DSL, WLAN, GSM/GPRS/UMTS, USB, Bluetooth, optical networks or the like. However, they may also be virtual processing units within a computer, which access a shared locating module 40. For instance, different programs on a computer, which trigger transactions among each other, may exchange data with each other in connection with which a subsequent verification requirement arises later on as to whether and when the data were exchanged or processed between the individual processing steps (=programs or "virtual processing units").

Another useful embodiment of the system is to link the useful information with supplementary information ZD31, ZD32 of locating modules 41, 42, 43, 44, equivalent to locating module 40, of each forwarding processing unit 31, 32, 33, 34 during routing across a plurality of processing units 31, 32, 33, 34 in a larger network 30 from a transmitting processing unit 10 to a receiving processing unit 20 via a plurality of forwarding processing units. By forming a relation, it is then possible to subsequently establish the local and also temporal path of useful data ND of the transaction via the processing units of network 30.

In another useful development, forwarding processing units 31, 32, 33, 34 may once again represent virtual processing units in the form of data-processing programs on a physical computer having a physical locating module. Due to the linking of the useful information to be processed in the programs with the virtual processing units involved in the transactions, it is possible to retroactively reconstruct the processing time of the resulting useful data, for example. Moreover, it can be reconstructed whether the processing unit processing the useful data was moved from its location (for instance for criminal manipulation at another location; in a stationary processing unit, the supplementary data must indicate the same location for each step in the transaction).

Another useful development of the system it to provide a changeable mobile data carrier, such as a chip card, to trigger the transaction in transmitting processor 10 of the transaction system. Useful data ND to be transmitted, or a portion of the useful data to be transmitted, are/is originally located on the chip card. One pertinent application case is payment via a chip card. For this purpose a chip card is inserted into transaction-triggering processing unit 10. The useful data of the chip card, such as an owner identification, are transmitted to transaction-triggering processing unit 10 where they are provided with additional useful data, for instance a typed-in PIN number and an amount of money to be transferred, and supplied with the supplementary information, such as the location and chronological time, of locating module 40 of transaction-triggering processing unit 10.

Another useful development of the system in the case of a changeable mobile data carrier such as a chip card, for instance, is to store the supplementary information or portions of the supplementary information of locating module 40 of transaction-triggering processing unit 10 on the data carrier. One application case in this connection could be as follows: A transaction takes place utilizing the chip card, for instance paying out or transferring an amount of money as described earlier. Transaction-triggering processing unit 10 additionally stores on the chip card supplementary information $ZD_Q$ generated by its locating receiver 40. This supplementary information includes, for instance, the chronological time and location of the triggering of the transaction. In this manner, also utilizing the chip card, it can be established later on when and where transactions were triggered by this chip card, without the chip card itself having to have a locating module.

In another useful development of the system, the changeable memory is replaced by a personal computer, a PDA (personal digital assistant=handheld computer), a mobile telephone, or a vehicle-driver information system without locating module with a connection to a transaction-triggering processing unit 10. The personal computer, PDA, mobile telephone or the vehicle-driver information system quasi replaces the chip card, but has a connection to transaction-triggering processing unit 10 having locating module 40, triggers the transaction there, receives and stores supplementary information $ZD_Q$ or portions of this supplementary information such as location and chronological time of the transaction-triggering processing unit having the locating module, the supplementary information having been received by transaction-triggering processing unit 10 including locating module 40. As a result, also using the stored supplementary information of the additional processing unit (PC, PDA, mobile telephone, driver-information system) without locating module, it is possible to retroactively determine at least at what time and by which transaction-triggering processing unit 10 with a locating module a transaction had been ordered.

An additional meaningful development is to link the supplementary information from locating modules 40, 50 with the useful data ND of the transaction in such a way that outside persons are unable to separate it, the linking being implemented with the aid of methods known in "digital watermarking", for instance. Manipulations by criminal interventions in the network of processing units 10, 20 are able to be prevented in this manner, or are at least made more difficult.

Another useful development is that supplementary information $ZD_Q$, $ZD_s$ carry so-called "quality of service information" from locating module 40, 50. This quality of service information could express, for instance, a reception reliability, or an accuracy or safety or legal liability in connection with the supplied supplementary information (such as time information or location information).

What is claimed is:

1. A method for transmitting useful data from a data source to a data sink, comprising:
   connecting the data source to a locating unit;
   at the data source, linking supplementary data to the useful data, the supplementary data derived from information from the locating unit and including one of an item of time information describing a time value at the data source when the useful data is transmitted by the data source or an item of location information describing a location of the data source when the useful data is transmitted by the data source;

at the data source, transmitting the supplementary data to the data sink contemporaneously with the useful data;

at the data sink, linking additional supplementary data to the useful data after receiving the useful data at the data sink, the additional supplementary data being derived from additional information of a second locating unit connected to the data sink and including one of an item of time information describing a time value at the data sink when the useful data is received at the data sink or an item of location information describing a location of the data sink when the useful data is received at the data sink;

at a checking device, receiving the useful data, the supplementary data, and the additional supplementary data from the data sink; and at the checking device, processing the supplementary data and the additional supplementary data to reconstruct a transmission path that sequentially describes the transmission of the useful data from the data source to the data sink;

wherein the useful data includes non-location and non-time information that is processed at the data sink.

2. The method as recited in claim 1, further comprising: setting the supplementary data and the additional supplementary data in relation to each other.

3. A system for transmitting useful data from a data source to a data sink, comprising:

a first locating unit connected to the data source, the data source linking supplementary data to the useful data, the supplementary data derived from information from the first locating unit and including one of an item of time information describing a time value at the data source when the useful data is transmitted by the data source or an item of location information describing a location of the data source when the useful data is transmitted by the data source, and the supplementary data being transmitted to the data sink contemporaneously with the useful data;

a second locating unit connected to the data sink, the data sink linking additional supplementary data to the useful data after receiving the useful data at the data sink, wherein the additional supplementary data is derived from additional information of the second locating unit and includes one of an item of time information describing a time value at the data sink when the useful data is received at the data sink or an item of location information describing a location of the data sink when the useful data is received at the data sink;

a checking device that:
  receives the useful data, the supplementary data, and the additional supplementary data from the data sink; and
  processes the supplementary data and the additional supplementary data to reconstruct a transmission path that sequentially describes the transmission of the useful data from the data source to the data sink;
wherein the useful data includes non-location and non-time information that is processed at the data sink.

4. The system as recited in claim 3, further comprising: a device for setting the supplementary data and the additional supplementary data in relation to each other.

5. The system as recited in claim 3, wherein:
a relation corresponds to a time comparison of the supplementary data and the additional supplementary data, and
a run time of the useful information, from a time at which the useful information is transmitted by the data source to a time at which the useful information is received at the data sink, is determined thereby.

6. The system as recited in claim 5, wherein:
a relation corresponds to a location comparison of the supplementary data and the additional supplementary data, and
one of a distance and a run path between the data source and the data sink is determined thereby.

7. The system as recited in claim 6, further comprising:
linking the useful information in each forwarding processing unit with supplementary information generated in a locating unit assigned to the respective forwarding processing unit, on a path from the data source to the data sink via at least one forwarding processing unit, wherein the local path of the useful information is reconstructed by the relation.

8. The system as recited in claim 7, further comprising:
linking the useful information in each forwarding processing unit with supplementary information generated in a locating module assigned to the respective forwarding processing unit, on a path from the data source to the data sink via at least one forwarding processing unit, wherein the temporal processing sequence of the useful information is reconstructed by the relation.

9. The system as recited in claim 3, further comprising:
entering at least a portion of the useful information into the data source with the aid of a changeable memory corresponding to a chip card, which is analyzable by the data source.

10. The system as recited in claim 9, wherein the changeable memory is provided to store the supplementary data transmitted from the data source together with the useful data.

11. The system as recited in claim 10, wherein the changeable memory is a component of one of a personal computer, a mobile telephone, and a personal digital assistant (PDA).

12. The system as recited in claim 3, wherein at least one of the data source and the data sink corresponds to one of a mobile telephone, a personal computer, a laptop computer, a PDA computer, a driver-information system of a motor vehicle, and an automated teller machine.

13. The system as recited in claim 3, wherein the locating unit includes one of a satellite receiver corresponding to one of a Global Positioning System (GPS) receiver and a Galileo receiver, a mobile radio receiver corresponding to one of a Global System for Mobile Communications (GSM), General Packet Radio Service (GPRS), and Universal Mobile Telecommunications System (UMTS) mobile radio receiver, an inertial sensor system, a digital map, and a map-matching routine.

14. The system as recited in claim 3, wherein the useful data and supplementary data are linked to each other using encryption technology.

15. The method as recited in claim 1, wherein:
the supplementary data is linked when the data source begins transmitting the useful data, and
the additional supplementary data is linked when the data sink receives the useful data and the supplementary data.

16. The system as recited in claim 3, wherein:
the supplementary data is linked when the data source begins transmitting the useful data, and
the additional supplementary data is linked when the data sink receives the useful data and the supplementary data.

17. The method as recited in claim 1, wherein:
the transmitted useful data and the transmitted supplementary data are received by a forwarding unit connected to a third locating unit;
the forwarding unit links a second additional supplementary data derived from information from the third locating unit and including one of an item of time information describing a time value at the forwarding unit when the useful data is transmitted by the forwarding unit or an item of location information describing a location of the forwarding unit when the useful data is transmitted by the forwarding unit; and the forwarding unit transmits the supplementary data to the data sink together with the useful data, by forwarding the useful data and the supplementary data contemporaneously with the second additional supplementary data to the data sink.

18. The system as recited in claim 3, further comprising:

a forwarding unit that receives the transmitted useful data and the transmitted supplementary data, wherein the forwarding unit:

is connected to a third locating unit;

links a second additional supplementary data derived from information from the third locating unit and including one of an item of time information describing a time value at the forwarding unit when the useful data is transmitted by the forwarding unit or an item of location information describing a location of the forwarding unit when the useful data is transmitted by the forwarding unit; and transmits the supplementary data to the data sink together with the useful data, by forwarding the useful data and the supplementary data contemporaneously with the second additional supplementary data to the data sink.

* * * * *